(Model.)

W. MARKS.
FERTILIZER DISTRIBUTER.

No. 259,326. Patented June 13, 1882.

2 Sheets—Sheet 1.

WITNESSES:
H. G. Phillips.
Chas. H. Caldwell.

INVENTOR:
Walter Marks,
by Geo. B. Selden,
atty

N. PETERS, Photo-Lithographer, Washington, D. C.

(Model.) 2 Sheets—Sheet 2.
W. MARKS.
FERTILIZER DISTRIBUTER.
No. 259,326. Patented June 13, 1882.
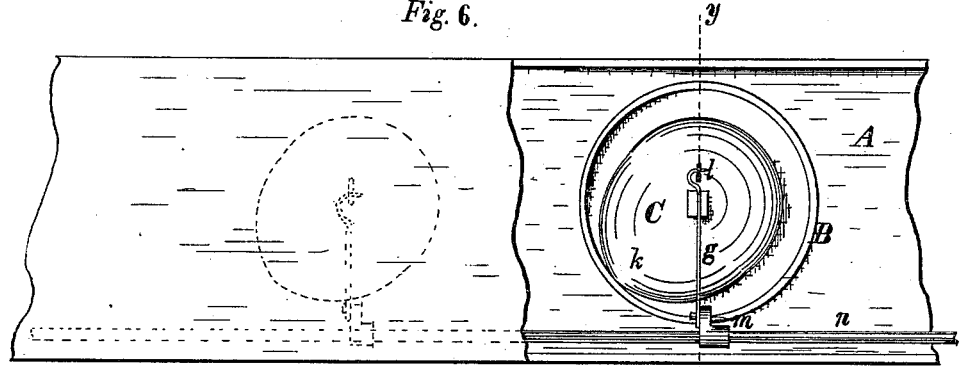
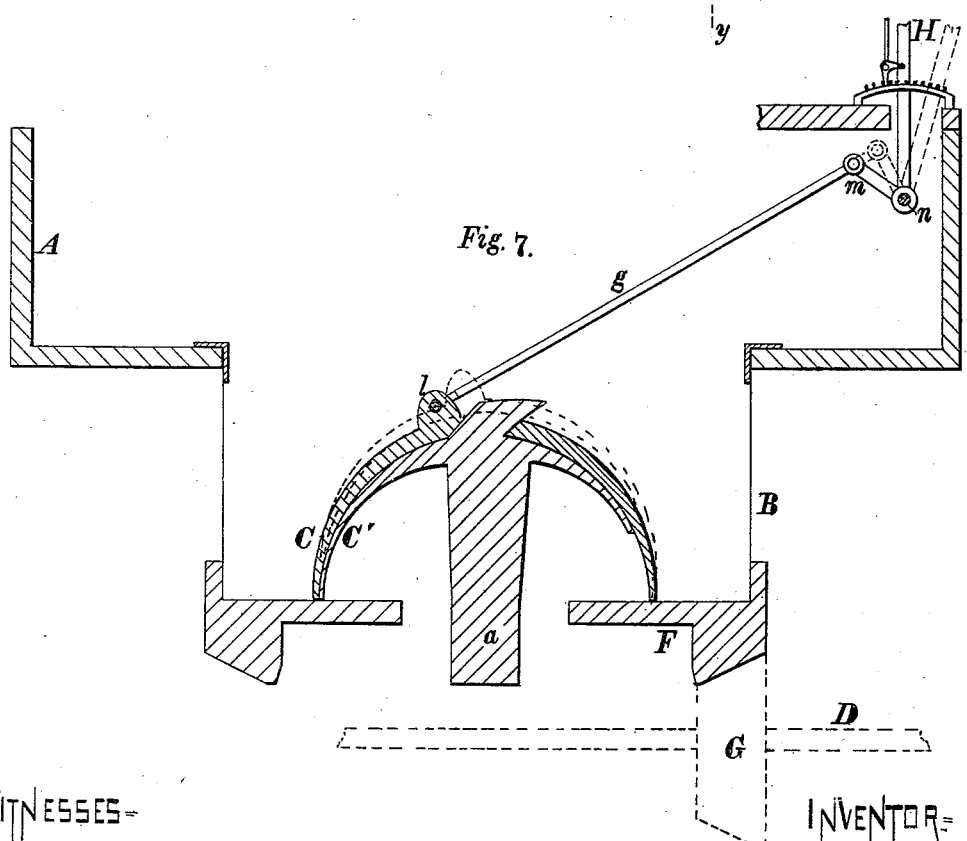
WITNESSES=
H.G. Phillips.
Chas. H. Caldwell.
INVENTOR=
Walter Marks,
by Geo. B. Selden,
atty.

UNITED STATES PATENT OFFICE.

WALTER MARKS, OF CHAPINVILLE, NEW YORK.

FERTILIZER-DISTRIBUTER.

SPECIFICATION forming part of Letters Patent No. 259,326, dated June 13, 1882.

Application filed March 16, 1882. (Model.)

*To all whom it may concern:*

Be it known that I, WALTER MARKS, of Chapinville, Ontario county, New York, have invented certain Improvements in Fertilizer-Distributers, of which the following is a specification, reference being had to the accompanying drawings.

My invention relates to an improved means of adjusting the rate of feed of the fertilizer in the fertilizer-distributers which have been heretofore patented to me; and it consists in making the feeding-shell movable, so as to vary the size of the feed-orifice, as hereinafter more fully set forth.

Figure 2:
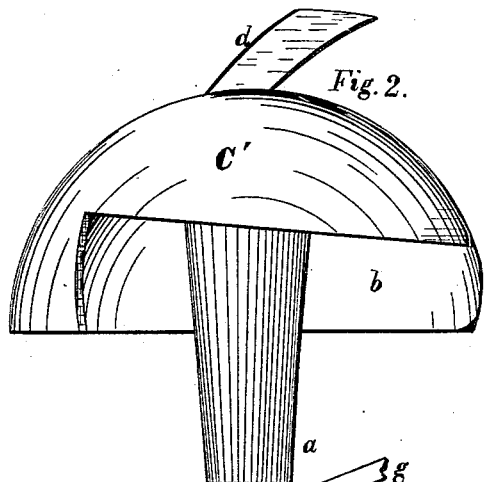
Figure 1:
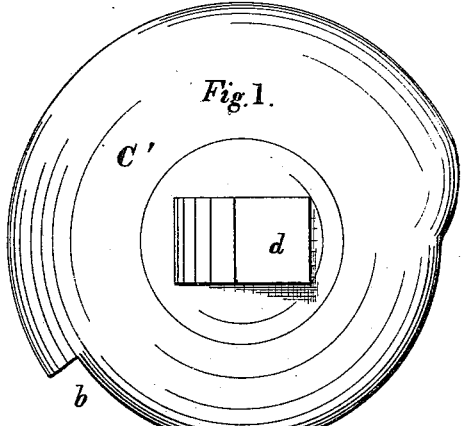
Figure 3:
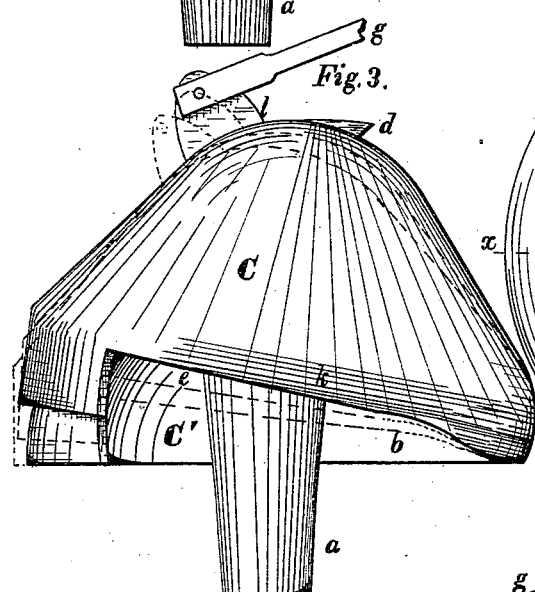
Figure 4:
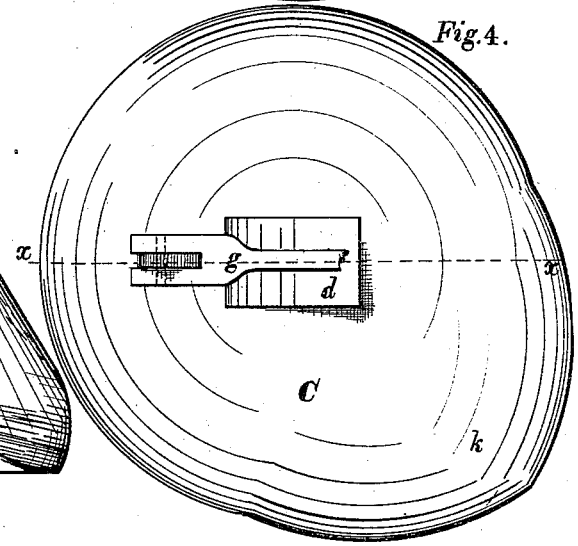
Figure 5:
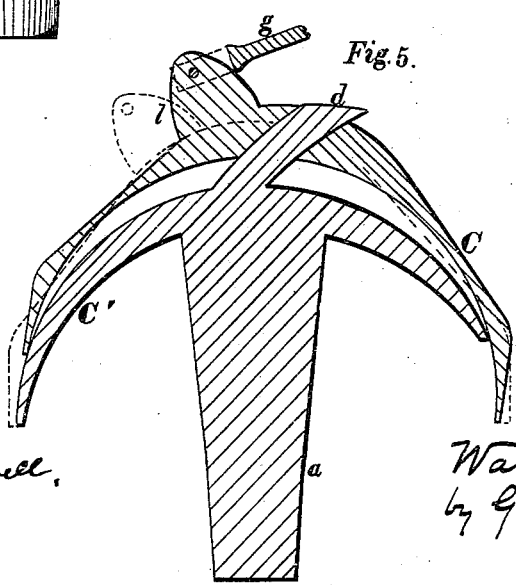

My present improvements in fertilizer-distributers are represented in the accompanying drawings, in which Figure 1 is a plan view of the lower or stationary feed-shell. Fig. 2 is a side elevation of the same. Fig. 3 is a side elevation of the upper or adjustable feed-shell in position on the stationary feed-shell. Fig. 4 is a plan view of the same. Fig. 5 is a vertical section on the line $x\,x$, Fig. 4. Fig. 6 is a plan view of a portion of the hopper and feed-cup. Fig. 7 is a section on the line $y\,y$, Fig. 6.

In the accompanying drawings, A is the hopper, which is intended to be attached to a grain-drill in such position that the fertilizer is delivered from the hopper into the drill-tube through the revolving feed-cups B and the adjustable feed-shell C. Each drill-tube is furnished with a corresponding feed-cup and adjustable shell. The feed-cups are attached to the bottom of the hopper and driven by the horizontal shaft D and bevel-gearing F and G.

The feed-shell consists of an inner or lower portion, C′, which is attached to the frame which supports the feed-cup in a manner similar to that shown in my former patents by means of the central spindle, $a$, and a suitable locking device. It is provided with an opening, $b$, Figs. 2 and 3, a portion of the lower margin of the shell being cut away to permit the passage of the fertilizer into the interior of the shell. At its top it is provided with a projection or lug, $d$, which passes through an opening in the upper or adjustable feed-shell, C. The adjustable feed-shell is of a form corresponding with that of the lower one, being placed over the latter, and provided with a feed-opening, $e$, corresponding with the opening $b$ in the stationary shell, but of smaller area. By raising or lowering the upper shell on the lower one the size of the feed-opening may be varied, as represented by the dotted lines in Fig. 3. As the upper shell is raised from its lowest position the area of the feed-orifice is increased, until at its highest position the rate of delivery of the fertilizer is at its maximum. The adjustable shell is provided with a projecting lip, $k$, the feed-opening $e$ being formed in one side of the lip, as represented in the drawings. The adjustable feed-shell is controlled relatively to the bottom of the feed-cup by the handle H and connection $g$.

The upper feed-shell, C, is provided with a lug, $l$, to which the connection $g$ is pivoted. The upper end of the connection $g$ is attached to the outer end of an arm, $m$, fastened on the rock-shaft $n$, which extends lengthwise of the hopper, being supported either inside or outside of the same by suitable journals.

The handle H is secured to the rock-shaft, and it is provided with a spring-catch working into the notches of a segment or other suitable device for fastening the arm in any desired position. The movement of the handle H rotates the shaft $n$, and the motion is communicated to the adjustable shell C by the arm $m$ and connection $g$. The handle may be placed at either end of the hopper, and it may project vertically or horizontally.

Instead of the rock-shaft $n$, any other suitable device may be employed to adjust the position of the feed-shell C, as, for instance, a horizontally-sliding or a vertically-moving bar or rod connected to the feed-shells by suitable connections. The bar may be arranged to move bodily to and from the side of the hopper in any preferred manner.

It frequently happens in the practical operation of grain-drills provided with fertilizer-distributers that some portion of the field requires an increased quantity of fertilizer. This is usually effected by changing the gearing so as to increase the speed of the distributer; but by my present improvement I am enabled to vary the rate of the feed instantaneously by a single movement of the handle H and to sow an increased amount of fertilizer on any portion of the field, however small, which requires it.

It is obvious that the adjustable feeding-shell, instead of being constructed to turn upward on the curved lug $d$, might be arranged to be adjusted vertically on a straight lug or spindle, as the inner shell may be so formed as to prevent the escape of the fertilizer on the rear side of the lip.

I do not claim herein anything which has been previously patented to me.

I claim—

1. In combination with the feed-cup of a fertilizer-distributer, the adjustable feed-shell C, substantially as and for the purposes set forth.

2. The combination, with the feed-cup B, of the stationary feed-shell C' and the adjustable feed-shell C, substantially as and for the purposes set forth.

3. The combination, with the adjustable feed-shell C, of the handle H and connection $g$, whereby the position of the feed-shell relatively to the bottom of the feed-cup may be controlled, substantially as and for the purposes set forth.

WALTER MARKS.

Witnesses:
GEO. B. SELDEN,
H. G. PHILLIPS.